United States Patent [19]
Wilkens

[11] 3,978,844
[45] Sept. 7, 1976

[54] COOKING VESSELS HAVING INTEGRAL GAS AND BURNER ASSEMBLY

[75] Inventor: Arnold J. Wilkens, Ridgefield, N.J.

[73] Assignee: Lawrence Peska Associates, Inc., New York, N.Y. ; a part interest

[22] Filed: Apr. 7, 1975

[21] Appl. No.: 565,856

[52] U.S. Cl. ................................ 126/38; 126/44; 222/3
[51] Int. Cl.² ............................................ F24C 5/20
[58] Field of Search .............. 222/3; 99/422, 424, 99/425; 126/38, 373, 350 R, 345, 9 R, 9 B, 44

[56] References Cited
UNITED STATES PATENTS

| | | | |
|---|---|---|---|
| 3,080,861 | 3/1963 | Amero | 126/38 |
| 3,809,054 | 5/1974 | Bowman | 126/38 |
| 3,832,127 | 8/1974 | Moriya | 431/344 |

Primary Examiner—John J. Camby
Assistant Examiner—Larry I. Schwartz
Attorney, Agent, or Firm—Jack D. Slobod

[57] ABSTRACT

A cooking utensil which has a handle housing a gas supply. The handle is connected by a conduit to a burner which is fixed to the under side of the cooking utensil.

2 Claims, 6 Drawing Figures

COOKING VESSELS HAVING INTEGRAL GAS AND BURNER ASSEMBLY

BACKGROUND OF THE INVENTION

The invention relates to cooking utensils and particularly utensils having a heat source integral therewith. The prior art includes various apparatus which include an integral heat source. Electric coffee pots and electric tea kettles are well known. Other apparatus having a general relationship to this sort of apparatus include that shown in the following U.S. patents: Garrett, et al, U.S. Pat. No. 2,728,835; Hunt, U.S. Pat. No. 929,949; Tylle, U.S. Pat. No. 2,973,756; Williams, U.S. Pat. No. 3,730,165; and Guerrero, U.S. Pat No. 3,608,538. Electrically powered apparatus of the type heretofore known such as that used in coffee pots and tea pots do not provide sufficient flexibility for many applications. More particularly it is limited to use in those applications where an electrical receptacle is conveniently at hand. A further problem exists in that even in those locations where an electrical receptacle may be disposed within the same room it may be inconvenient to provide extension cords or even place cords in a position where they may be dangerous to individuals within the room because of the hazard presented by potential tripping. Another problem of course exists where it is desired to use such apparatus in locations where there is no electric source such as camping, picnicing or the like.

Accordingly it is a primary object of the invention to provide apparatus which is simple and inexpensive to manufacture and which is convenient to use.

Yet another object of the invention is to provide apparatus which may be utilized without the necessity for providing a separate burner.

SUMMARY OF THE INVENTION

It has now been found that these and other objects of the invention may be attained by a discrete cooking utensil having an integral generally planar cooking surface. A burner is carried by the vessel beneath the cooking surface and a conduit is provided in fluid communication with the burner. A valve is provided in the conduit for modulating gas flow to the burner. An elongated handle for gripping the utensil is provided which has an interior chamber for receiving a quantity of flammable gas.

Normally the handle will be provided with a second fitting for receiving a second conduit in fluid communication with another container of fuel whereby the chamber within the handle may be charged with fuel.

BRIEF DESCRIPTION OF THE DRAWING

The invention will be better understood by reference to the accompanying drawing in which.

DESCRIPTION OF THE PREFERRED EMBODIMENT

Figure 1:
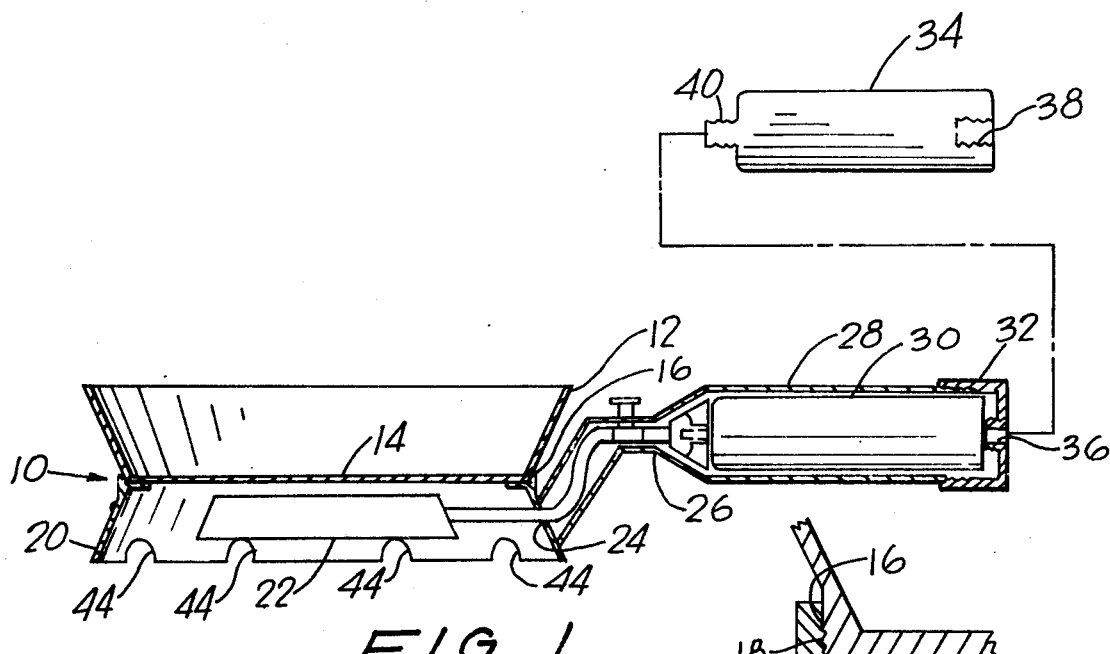
FIG. 1 is a sectional view taken through a vertical plane of the apparatus in accordance with the invention.
Figure 3:
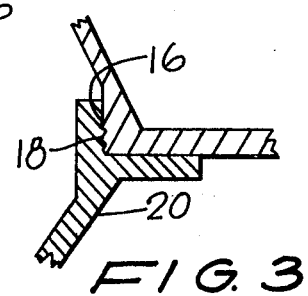
FIG. 3 is a broken away sectional view to an enlarged scale of a portion of the apparatus shown in FIG. 1.
Figure 2:
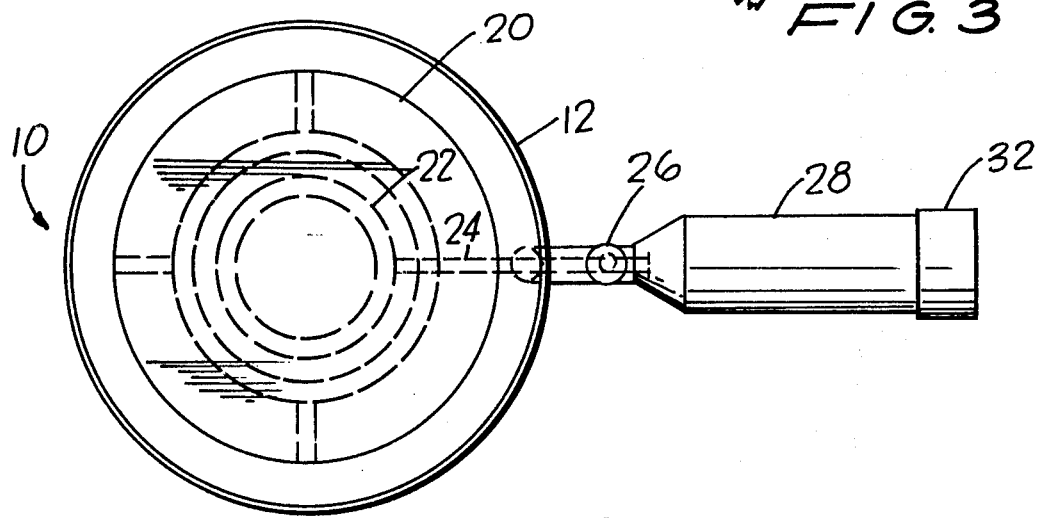
FIG. 2 is a plan view of the apparatus shown in FIG. 1.

Referring now to FIGS. 1 through 3 there is shown one form of the invention which includes a pan 10 which is provided with a cooking vessel 12 having a generally planar cooking surface 14 and the outer lower surface 16 thereof threaded for engagement with a lip 18 on the base 20. The base has disposed in fixed relationship thereto a gas burner 22 which is supplied by means of a conduit 24 having a valve 26 therein for modulating gas flow to produce varying amounts of heat at the burner 22. Connected to the valve 26 is a handle 28 which carries therein a separate cannister or tank 30 which contains a gas such as propane which is to be burnt in the burner 22. The construction of the apparatus in accordance with the invention may utilize a tank which is actually the handle or as shown in FIG. 1 the tank may slide coaxially within the handle 28 for connection to the valve 26. In one form of the invention a cap 32 is provided having threads engaging the outside surface of the handle 28 and this cap 32 may be selectively removed for installing an additional cannister 34 within the handle 28. Alternatively a fitting 36 is provided in the cap 32 and a valve 26 is provided in some forms of the cannister 34 such that recharging may be accomplished merely by screwing an additional cannister 38 into a cannister which is already been installed in the handle 28. In this form of the invention it is possible to recharge, dispose or replace the cannister 28 within the handle while continuing operation of the burner 22. Such charging may be accomplished from a larger cannister such as that typically used for camping stoves and for workshop sottering apparatus. The valve 26 will be ordinarily of the type which is frequently used on earlier propane cannisters which provide that when a fitting such as the fitting 40 of cannister 34 is screwed into the valve 26 fluid communication will be established. When the fitting 40 of cannister 34 is screwed out of engagement with the fitting of valve 36 the valve 36 will seal and prevent any leakage out of the cannister 30.

It will be understood that the threads 16 and 18 which engage the flange of the base 20 and the cooking vessel 12 are of the type which lock after rotation of approximately 180° rather than requiring a plurality of turns. Openings 44 are provided along the circumference of the base 20 to allow oxygen to reach the burner and for combustion products to escape from the area of the burner. It will be understood that in some forms of the invention additional openings will be required.

Figure 4:
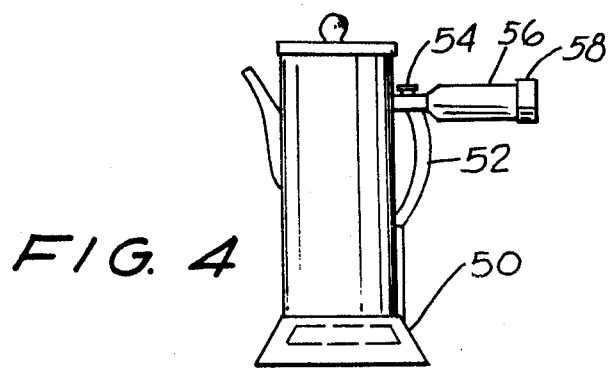
FIG. 4 is a side elevational view of another embodiment of the invention.
Figure 5:
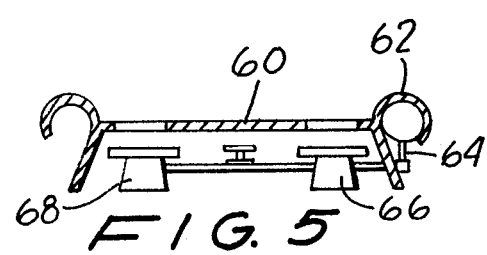
FIG. 5 is a sectional view taken through vertical plane of still another embodiment of the invention.
Figure 6:
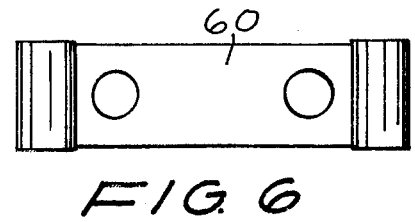
FIG. 6 is a plan view of the apparatus shown in FIG. 5.

Other embodiments of the invention are shown in FIGS. 4, 5 and 6. These embodiments are similar to that shown in FIGS. 1 through 3 and include the use of a burner 50 in the embodiment shown in FIG. 4 which is provided with a conduit 52 in fluid communication with a valve 54 which is in turn in fluid communication with a cannister within the handle 56. A cap 58 is provided for convenient replacement of the cannister. Similar to the coffee pot shown in FIG. 4 is the grille 60 shown in FIGS. 5 and 6. In this application the cannister 62 for fuel is connected by a conduit 64 to burners 66 and 68. Other details of the construction will be apparent by reference to the description of the apparatus shown in FIGS. 1 through 3.

Having thus described my invention, I claim:

1. A cooking apparatus which comprises: a vessel; a base supporting said vessel; a burner carried by said base beneath said vessel for heating said vessel; an elongated tubular handle projecting from said base; an adjustable valve within said handle adjacent said base; a conduit interconnecting said valve and said burner; said adjustable valve having a female fitting remote from said conduit; a first elongated container of gaseous fuel for positioning coaxially within said handle; said first container having male and female fittings respectively at its opposite ends; said fittings of said first container being directed axially of said container; said male fitting being engageable with the female fitting of said valve; said male and female fittings of said first container being dimensioned for mating engagement with each other in a manner that a second fuel container identical with the first container may be engaged with said female fitting of said first container for supplying addition fuel to said burner via said first container and for supporting said first and second containers in coaxial relationship.

2. The apparatus of claim 1 wherein said vessel is threadably engaged in said base.

* * * * *